J. NIELSEN.
MILKING MACHINE.
APPLICATION FILED NOV. 21, 1912.
1,070,166.
Patented Aug. 12, 1913.
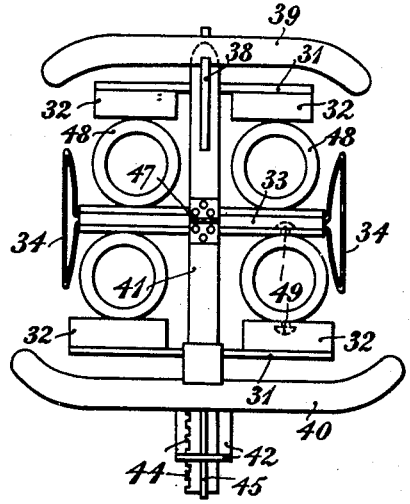
Fig.2.
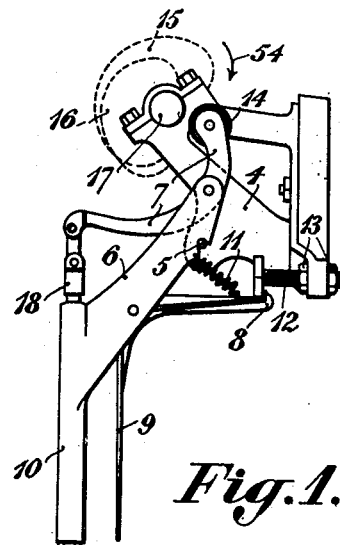
Fig.1.
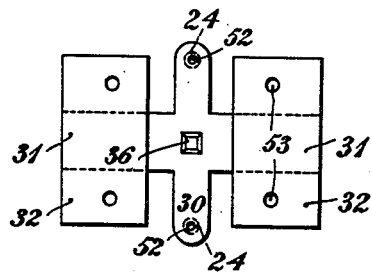
Fig.3.
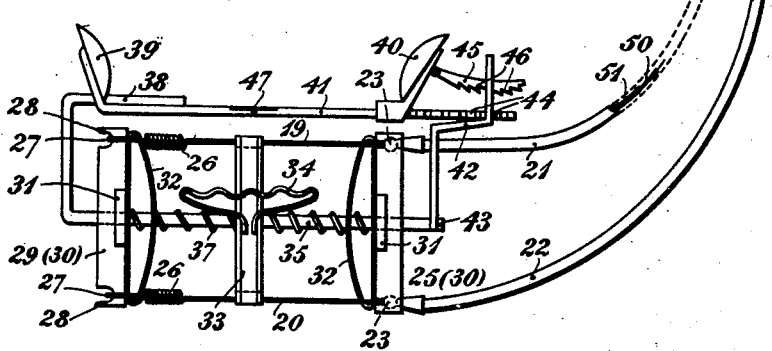
Witnesses:
John Murtagh
F. Hogg.
Inventor:
Jens Nielsen
by Gocralk Goepel
Attorneys.

UNITED STATES PATENT OFFICE.

JENS NIELSEN, OF FREDERIKSBERG, NEAR COPENHAGEN, DENMARK.

MILKING-MACHINE.

1,070,166.  Specification of Letters Patent.  Patented Aug. 12, 1913.

Application filed November 21, 1912. Serial No. 732,700.

*To all whom it may concern:*

Be it known that I, JENS NIELSEN, of Mariendalsvej No. 28, Frederiksberg, near Copenhagen, in the Kingdom of Denmark, have invented certain new and useful Improvements in Milking-Machines, of which the following is a specification.

The invention relates to a milking machine, in which the milking member is actuated by means of a flexible cable, which is inclosed in a cable cover, and of which one end is connected with the milking member while the other is set in motion by a driving mechanism.

The invention refers specially to milking machines in which two milking members of about the width of the udder can be moved into contact with, and away from a fixed intermediate member of similar width, in such a way that the two outer members have their upper parts first moved inwards so that all four teats are first clamped together at the root, whereupon also the lower part of the outer members is moved inward so that the milk flows out of the teats which are closed above. These movements are brought about by means of two cables, each of which has its driving or directing member (and these are operated successively by means of cams or the like on a common cam axle or the like) and the cable covers of which are connected above and below with the one or front middle part of the milking organ, while the cables themselves are connected with the other or rear middle part of the milking member, similarly above and below.

The object of the invention is to make a milking machine of this kind which will act well and with certainty.

According to the invention the movable milking members are suspended on one or more rod shaped driving members connected with the intermediate member in such a way that the intermediate member can within certain limits rock or swing around a horizontal or vertical axis. There are further inserted in the connection between the two cables and their corresponding or rear milking member, traction springs which yield when the traction has reached a certain magnitude. This springing action also assists other or front milking member connected with the cable covers, since experiment has shown that the cable covers push or press on this milking member with exactly the same force as that with which the cable pulls on the other milking member. The two milking members thus exert a pressure of equal amount, each upon a pair of teats, and if the resistance of the latter, or the resistance of a single teat against the clamping together, has reached a certain limit, both the milking members will yield like springs as the result of the action of the traction springs referred to. Means are also provided to secure a proper position of the one milking machine or the milking member in relation to the other, and to act upon the latter in a manner favorable to the flowing of the milk. These means consist of two suitable shields, which on two or several sides, especially the front and rear sides, apply themselves to each other, and are connected with the intermediate member mentioned. These shields which themselves execute small movements during the movements of the milking members, whereby they effect massage of the udder, are actuated adjustably by springs or the like, so that they can be fitted to udders of various sizes, and the fixed intermediate member can be brought to lie between the two pairs of teats.

On each side of the fixed intermediate member, between this and the movable milking members, it is advantageous to apply easily removable cases of india rubber or the like, open above and below, in which each teat hangs down. These cases assist in rendering the action of the milking member on the teats and the udder, or upon the roots of the teats more gentle.

In the cow shed in which the present milking machine is to be brought into use, there are arranged along the rows of stalls, rotating shafts, which have for each cow the two cams or other similar actuating members above described. The cables end in lever arms which are hung up in a common carrier which at a fixed point can be attached so as to be easily removable in such a position that the lever comes to lie in the path of the cams. In this position the carrier is adjustable by means of a suitable member, so that the levers are moved to a greater or less extent when the cam is in action. There is a fixed regulating member of this kind for each cow, and when this is rightly adjusted the milking machine will carry out, for each cow, motions of exactly the extent required by the individual charameter of the udder and the teats of each cow. This fixed regulating member is further no hindrance to the removal of the carrier and the milking machine from one milking place or from one cow to the next in succession.

In the accompanying drawing: Figure 1 is a side elevation illustrating a method constructing the milking machine with cables and driving mechanism, Fig. 2 is a plan of the milking machine, in which figure the rear part is above and the front part below. Fig. 3 is a view of the front milking member looked at from the inner side.

In front of each milking place or stall e. g. at its head end, there is fixed a suitable bearer 4, Fig. 1 which has a rod 5 for hanging up the carrier 6, for the levers referred to above. These can when they are not being operated by their cams, have similar positions, and in the figure they cover one another, so that only the front lever 7 is visible. In the carrier 6 there is also suspended a hook 8, the arm 9 of which can be easily grasped by the hand, together with the lower part 10 of the carrier, which has the shape of a handle. In this position in which the arm 9 is turned or pressed toward the handle 10, and a spring 11, which connects the hook and the carrier, is stretched, the carrier can easily be adjusted in its place on the rod 5, at the same time that the hook comes to lie behind the head of a screw 12, and is locked by this head when it is released by the hand. The screw 12 which is screwed into the fixed bearer 4, can by means of counter nuts 13 be secured in a more or less screwed-in position, and in consequence of this the carrier 6 when it is suspended from the bearer will stand more or less upright. The ends of the lever 7 provided with rollers 14 will thus pass over more or less to the left side of the figure, that is to say they will come to lie more or less in the path of the cams 15 and 16 on the driving shaft 17, the bearing of which may be formed by the bearer plate 4.

The handle 10 forms the guide for suitable rods 18 (of which only the front one is shown on the drawing) which are connected above by a joint with the levers 7, and below each with one of the two cables 19 and 20, see below in Fig. 1. The cable covers 21 and 22 are connected rigidly with the handle 10. The free ends of the cable covers have spherical ends 23, which fit into corresponding holes 24 (see the dotted circles in Fig. 3) above, and below into the rear milking member 25. The free ends of the cables are connected to helical springs 26, which end in loops 27 which engage above and below with hooks 28 on the rear milking member 29.

In the example shown, the front (and also the rear) milking member consists of a vertical middle piece 30, provided with arms 31, passing sidewise, each of which arms carries a broad flat spring 32, bent into the form of a cushion. The intermediate member 33 is made up of two plates, and has, on the one hand, suspension-stirrups 34 for the straps or the like wherewith the milking machine is suspended from the cow, and on the other hand in the middle a rod 35 (which may be rectangular) which passes through corresponding holes in the middle piece above mentioned of the movable intermediate member (see the hole in Fig. 3) 36, and guides these movable milking members possibly with the assistance of spring 37 on the guide rod 35. The rear (in Fig. 1 the left hand) end of the guide rod 35 is curved first upward and then forward, and on this vertical arm 38 passing forward, the back shield 39 is adjustably arranged. The front shield 40 is adjustably attached to a rod 41 which is connected behind with the shield 39, and is supported in front by a rectangular plate 42, which latter is secured to the front end of the guide rod 35, which may be done by means of the screw 43. The rod 41 has in front a row of teeth 44, and according as the one or the other pair of these teeth embraces the fixed plate 42, the rear shield 39 on the arm 38 will be drawn forward to a greater or less extent. On the outer side of the front shield 40 there is mounted a curved rod 45, which is guided by a slot in the fixed plate 42, and has a row of teeth 46 which allow of shifting the front shield in relation to the fixed plate 42, and also in relation to the milking machine 25, 29, and 33. Suitable springs, which are not shown, prevent the engagement of the teeth 44 and 46 with the plate 42 from being unintentionally broken. In order that the inclination of the shields 39 and 40 may be adjusted to the form of the udder, the rod 41 may be divided by the introduction of a hinge 47.

In Fig. 2 the cases 48 referred to above, of india rubber or the like, each of which is to receive a teat, are shown. These cases may have projections 49 like buttons, which can be inserted into corresponding holes, on the one hand in the cushions 32 (see the holes 53 in Fig. 3) and on the other hand in the plates of the intermediate member 33, so that the cases may be easily applied and removed.

The cables 19 and 20 consist of one or several long wires 50 which are best provided with a wire winding 51 for their length, or only at their ends where they are most exposed to wear, but this winding must not render the cable so thick that it cannot pass in the cable covers 21 and 22, and the various guiding holes e. g. the heads 23 of the cable covers, and the holes 52 of the intermediate member 30, which lie in the continuation of heads 23, see Fig. 3. The cable covers 21 and 22 consist of one or several layers of a stiff and tight spirally wound metal wire.

In the position of the cams 15 and 16 shown in Fig. 1 the cables and intermediate members are at rest. These latter are so far apart that the soft cases 48 which are to be applied, exert no pressure upon the teats at any point, which latter, therefore, in this period, which constantly recurs during the milking, are easily filled with milk from the udder. By rotating the shaft 17 in the direction of the arrow 54, the larger cam 15 will act upon the roller 14 and the lever 7, which belongs to the cable 19, with the result that traction will be extended upon this cable, while at the same time the corresponding cable cover 21 will be directed somewhat outward as the result of the reaction. The effect of this is that the milking member 25, in which the cable 19 pulls, and the milking member 29 upon which the cable cover 21 presses, will move toward each other so much above that the cases 48 at their upper part will be so far clamped together that all the fourt teats which hang down in these cases, will be shut off at the root. In consequence of the special form of the cam 15, this condition of traction and pressure will be maintained unchanged during half a rotation of the shaft 17. A suitably short time after the teats have been clamped at the root, the other cam 16 begins to act upon the second roller 14 and the second lever 7, which belong to the cable 20 with the result that traction is exerted upon this cable also, while the corresponding cable cover 22 exerts pressure. As the result of this traction and pressure the lower parts of the milking member 25 and 29 are brought together, the effect of this being that the cases 48 are pressed against the teats from above downward and cause the milk to flow out of the latter. When this action ceases the action of the cam 15 ceases first, and that of the cam 16 immediately afterwards, and the various parts then resume the position shown in the drawing, on the one hand through the proper action of the cable covers and on the other hand by the action of the springs 37. It is to be noted that the holes 36 of the milking members 25 and 29, by which the guide rod 35 is guided, offer no hindrance to the execution of the rocking or reciprocating movement by the milking members on this rod already described.

When the relative distance of the shields 40 and 39 and their position in relation to the fixed intermediate member 33, have been properly adjusted for a particular udder, that is to say by adjustment in relation to the plate 42, which is indirectly connected with the intermediate member 33, the intermediate member will be in the middle between the front and rear pairs of teats, and all the four teats will be regularly acted upon.

If one pair of teats be somewhat thicker than the other, this difference will be eliminated by the fact that the intermediate member 33, that is to say the whole milking machine will shift forward or backward during the periods of traction and pressure to a small extent of its own accord. If the one e. g. the right teat of one pair is thicker than the other, this difference will be eliminated by the fact that the corresponding movable milking member 25 or 29 will execute a correspondingly small vertical reciprocating movement on the rod 35, so that the one e. g. the left cushion 32 comes to lie closer to the milking member 33 than the other cushion. During these automatically regulated movements of the milking members, the springs 26 are in constant action, yielding at once when the traction at any point exceeds the proper limits. It is further clear that not only does the upper spring 26 act, when the milking members come together above, but the lower springs 26 can be stretched during this movement. Conversely the upper springs 26 can be stretched when the milking members come nearer together below.

When the milking of one cow is finished the milking machine is taken away, the handle 10 of the carrier 6 and the arm 9 are grasped by the hand so that the hook 8 is freed from the screw 12, the carrier is transferred to the next stall, and the milking machine is fitted to the next cow. Such great variations as may occur in the dimension of the teats owing to the different ages and the size or abnormality of the cows must be allowed for beforehand in adjusting the screws 12.

The form of construction of the driving members, adjusting members, milking members, guiding members etc. may be modified in various ways without departing from the essential features of the invention.

Having now particularly described and ascertained the nature of my said invention and in what manner the same is performed, I declare that what I claim is:

1. A milking machine, comprising a stationary milking member, adjustable side milking members, a suspension-rod for the side-members passing through the stationary member, cables and cable-covers connected with the side milking members, and means for actuating the cables and cable-covers independently of each other.

2. A milking machine, comprising a stationary member, adjustable side-members, a guide-rod passing through the stationary and side members, said rod being made rectangular in cross-section, cables guided in the stationary member and connected by springs with one of the side-members, cable-covers connected with the other side milking member, and means for imparting independent reciprocating motion to said side-members.

3. A milking machine, comprising a stationary milking member, adjustable side milking members, a guide-rod passing through the stationary and side members, said rod being made rectangular in cross-section, cushioning springs interposed between the stationary and side milking members, cables guided in the stationary member and connected by springs with one of the side-members, cable-covers connected with the other side milking member, and means for imparting independent reciprocating motion to said side-members.

4. A milking machine, comprising a stationary member, spring-cushioned side milking members, a central guide-rod for the said members, cables connected yieldingly with one side-member, cable-covers connected yieldingly with the other side-member, means for imparting reciprocating motion independently of each other to said cables and cable-covers, means for supporting the cable-actuating means, and means for releasing said cable-actuating means from the driving means or placing the same in operative connection therewith.

5. A milking machine, comprising a stationary member, spring-cushioned side milking members, a guide-rod passing through the stationary and side members, and supports on said guide-rod provided with yielding adjustable shields for applying the milking devices to the udder.

6. A milking machine, comprising a stationary member, spring-cushioned side milking members, means for applying the same to the udder, and cases for the teats introduced between the side milking members and stationary member.

In testimony, that I claim the foregoing as my invention, I have signed my name in presence of two subscribing witnesses.

JENS NIELSEN.

Witnesses:
ERNEST BOUTARD,
HJALMAR BOUTARD.